US009823081B2

(12) United States Patent
Crawford et al.

(10) Patent No.: US 9,823,081 B2
(45) Date of Patent: Nov. 21, 2017

(54) VEHICLE PASSENGER IDENTIFICATION

(71) Applicant: Ford Global Technologies, LLC, Dearborn, MI (US)

(72) Inventors: Mark Crawford, Belleville, MI (US); James Robert McBride, Saline, MI (US); Shane Elwart, Ypsilanti, MI (US); Schuyler Cohen, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 58 days.

(21) Appl. No.: 14/559,136

(22) Filed: Dec. 3, 2014

(65) Prior Publication Data

US 2016/0161266 A1 Jun. 9, 2016

(51) Int. Cl.
*B60W 30/06* (2006.01)
*G01S 17/89* (2006.01)
*G01C 21/34* (2006.01)
*G06Q 10/04* (2012.01)

(52) U.S. Cl.
CPC ............ *G01C 21/34* (2013.01); *G01S 17/89* (2013.01); *G06Q 10/047* (2013.01)

(58) Field of Classification Search
CPC .... B60W 30/00; B60W 30/025; B60W 30/06; B60W 40/08; B60W 2040/0809; B60W 2040/0881; B62D 6/00; G01C 21/34; G01S 17/89; G06Q 10/047
USPC ............................................... 701/23, 25, 28
See application file for complete search history.

(56) References Cited

U.S. PATENT DOCUMENTS

| 6,151,539 | A | * | 11/2000 | Bergholz | G01S 13/931 340/435 |
|---|---|---|---|---|---|
| 8,005,488 | B2 | | 8/2011 | Staffaroni et al. | |
| 9,194,168 | B1 | * | 11/2015 | Lu | E05F 15/70 |
| 9,581,997 | B1 | * | 2/2017 | Penilla | G05D 1/0011 |
| 2002/0095326 | A1 | | 7/2002 | Katz | |
| 2003/0034873 | A1 | | 2/2003 | Chase et al. | |
| 2004/0181552 | A1 | * | 9/2004 | Milne | G06F 17/30247 |
| 2005/0153707 | A1 | | 7/2005 | Ledyard et al. | |
| 2007/0291130 | A1 | * | 12/2007 | Broggi | G01S 17/023 348/218.1 |
| 2010/0114416 | A1 | * | 5/2010 | Au | G01C 21/165 701/23 |
| 2011/0052004 | A1 | * | 3/2011 | Lee | G06K 9/00221 382/103 |

(Continued)

FOREIGN PATENT DOCUMENTS

WO 2015099679 A1 7/2015

OTHER PUBLICATIONS

Wright; "Autonomous iPad taxi: safer than a minicab?"; electricpig.co.uk website; Oct. 19, 2010; publicly available at least as early as Oct. 28, 2010.*

(Continued)

*Primary Examiner* — Stephen Holwerda
(74) *Attorney, Agent, or Firm* — Frank A. MacKenzie; Bejin Bieneman PLC

(57) ABSTRACT

At least one first model represents a person. A request to pick up a passenger includes a first location and a personal identifier for the passenger. A vehicle is caused to navigate to the first location. The passenger is identified by comparing a second model generated from vehicle sensor data with the first model.

18 Claims, 2 Drawing Sheets

(56) References Cited

U.S. PATENT DOCUMENTS

| | | | |
|---|---|---|---|
| 2012/0041675 A1* | 2/2012 | Juliver | G06Q 10/08 |
| | | | 701/465 |
| 2012/0232943 A1 | 9/2012 | Myr | |
| 2013/0162792 A1 | 6/2013 | Lee et al. | |
| 2013/0231824 A1* | 9/2013 | Wilson | G05D 1/0246 |
| | | | 701/26 |
| 2013/0238167 A1* | 9/2013 | Stanfield | G08G 1/20 |
| | | | 701/2 |
| 2014/0172290 A1* | 6/2014 | Prokhorov | G01C 21/3602 |
| | | | 701/408 |
| 2014/0172727 A1 | 6/2014 | Abhyanker et al. | |
| 2014/0297092 A1* | 10/2014 | Delp | G05D 1/0212 |
| | | | 701/25 |
| 2015/0339928 A1 | 11/2015 | Ramanujam | |
| 2015/0363986 A1* | 12/2015 | Hoyos | G07C 9/00571 |
| | | | 340/5.61 |

OTHER PUBLICATIONS

Baydere et al., "ME 302: The Future of the Automobile", Car-Sharing Service using Autonomous Automobiles, Spring 2014, 10 pages.
GB Search Report dated Mar. 30, 2016 (3 pages).

* cited by examiner

VEHICLE PASSENGER IDENTIFICATION

BACKGROUND

A vehicle such as an autonomous vehicle, a taxi or livery vehicle, etc., may be requested to pick up a passenger on demand. For example, a passenger using a communication device (e.g. smartphone) could request pickup at his/her current location by sending GPS (global positioning system) coordinates to the vehicle or a driver of the vehicle. The vehicle could then navigate to the GPS coordinates. A problem arises, however, in that, upon arrival at specified GPS coordinates, it may be difficult to identify a location of the target passenger with sufficient precision to actually pick the passenger up due to inaccuracies and/or imprecision provided GPS coordinates. Errors resulting from using GPS data can cause a vehicle to stop at a location separated from an actual location of a target passenger by as much as several meters, on a wrong side of a street or in a wrong driveway, etc.

DRAWINGS

DETAILED DESCRIPTION

System Overview

Figure 1:
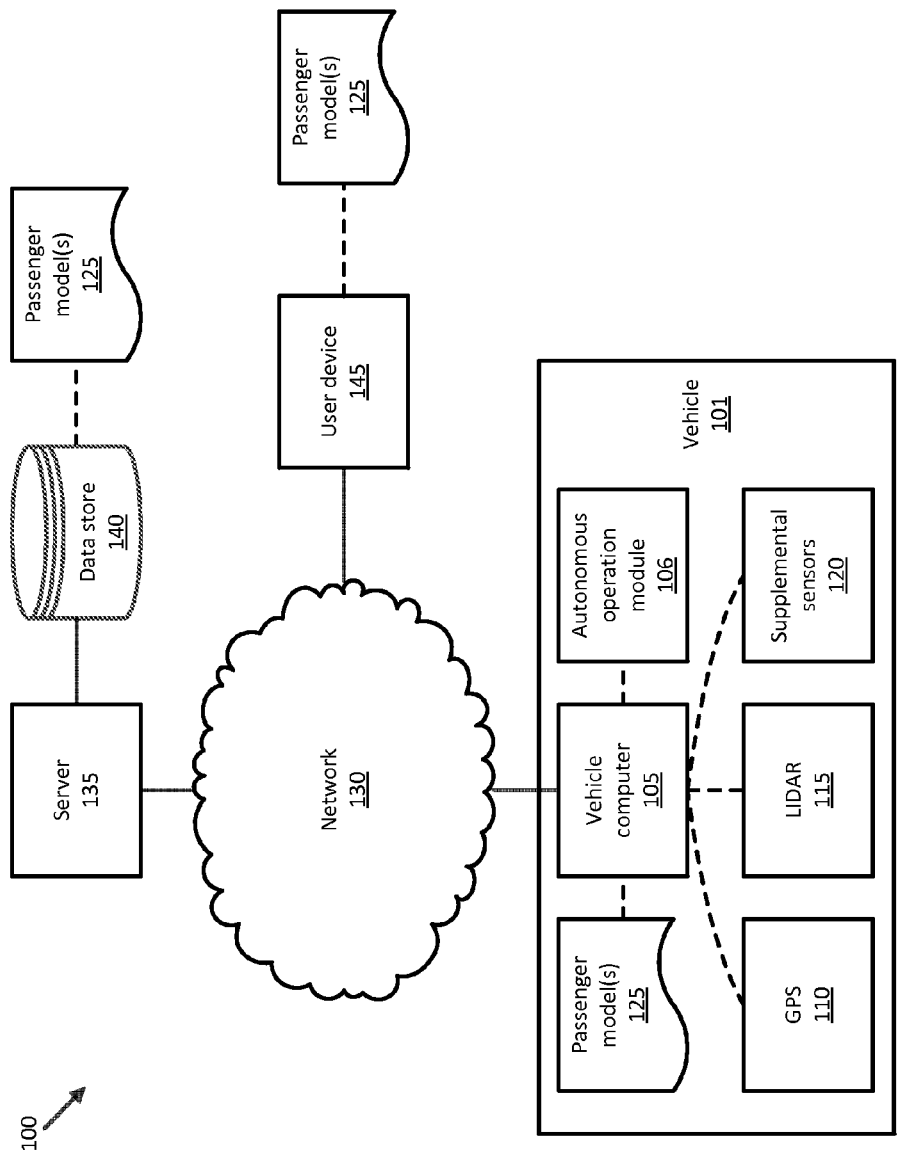
FIG. 1 is a block diagram of an example system for vehicle passenger identification and/or location.

FIG. 1 is a block diagram of an example system 100 for vehicle passenger identification and/or location. A vehicle 101 computer 105 is programmed to receive inputs, e.g., from a remote user device 140, indicating global positioning system (GPS) coordinates of a passenger to be picked up by the vehicle. A vehicle 101 GPS 110 that is included in or communicatively coupled to the computer 105 generates a route to the provided GPS coordinates. Upon arriving at the specified GPS coordinates, the computer 105 receives data from one or more lidar sensors 115, and possibly also from one or more cameras or other supplemental sensors 120. The computer 105 then compares the sensor data with one or more personal models 125 representing respective potential passengers for the vehicle 101. The personal models 125 may be stored in a memory of the computer 105 and/or provides from a data store 140 associated with a remote server 135 and/or the user device 145. In any event, when a potential passenger is identified within a predetermined confidence range, e.g., from 90-100%, the vehicle 101 navigates to a location of the passenger 101 with a degree of precision that may be an order of magnitude higher than a degree of precision possible using GPS data alone.

System Elements

A vehicle 101 computer 105 generally includes a processor and a memory, the memory including one or more forms of computer-readable media, and storing instructions executable by the processor for performing various operations, including as disclosed herein. The memory of the computer 105 may further store one or more personal models 125, which may be generated in a manner described herein below. The memory of the computer 105 also generally receives and stores data from sensors such as lidar 115 and possibly also supplemental sensors 120. In addition, the memory of the computer 105 may store various data, including data relating to a vehicle 101 location provided by the GPS 110, and other data collected from vehicle 101 controllers, sensors, etc.

Accordingly, the computer 105 is generally configured for communications on a bus such as an Ethernet bus, a controller area network (CAN) bus or the like, and/or may use other wired or wireless protocols, e.g., Bluetooth, etc. That is, the computer 105 can communicate via various mechanisms that may be provided in the vehicle 101 and/or other devices such as a user device 145. The computer 105 may also have a connection to an onboard diagnostics connector (OBD-II) port, e.g., according to the J1962 standard. Via the Ethernet bus, CAN bus, OBD-II connector port, and/or other wired or wireless mechanisms, the computer 105 may transmit messages to various devices in a vehicle and/or receive messages from the various devices, e.g., controllers, actuators, sensors, etc. In addition, the computer 105 may be configured for communicating, e.g., with one or more remote servers 135, e.g., via a network 130, which, as described below, may include various wired and/or wireless networking technologies, e.g., cellular, Bluetooth, wired and/or wireless packet networks, etc.

Generally included in instructions stored in and executed by the computer 105 is an autonomous driving module 106. Using data received in the computer 105, e.g., from various sensors, from a vehicle 101 communications bus, from the server 135, etc., the module 106 may control various vehicle 101 components and/or operations without a driver to operate the vehicle 101 autonomously or semi-autonomously (i.e., control some but not all vehicle 101 operations). For example, the module 106 may be used to regulate vehicle 101 speed, acceleration, deceleration, steering, gear shifts, operation of components such as lights, windshield wipers, etc.

A variety of sensors and other sources may provide data for autonomous or semi-autonomous operation of the vehicle 101, as just mentioned. For example, various controllers in a 101 vehicle may provide data via a controller area network (CAN) bus, e.g., data relating to vehicle speed, acceleration, etc. Further, sensors or the like, GPS 110, etc., could be included in a vehicle to provide data to the computer 105, e.g., via a wired or wireless connection. Sensors could include mechanisms such as RADAR, lidar 115, cameras or the like, sonar, motion detectors, etc. In addition, sensors could be included in the vehicle 101 to detect a position, change in position, rate of change in position, etc., of vehicle 101 components such as a steering wheel, brake pedal, accelerator, gearshift lever, etc.

The navigation system, e.g., global positioning system (GPS), 110, is generally known for a variety of operations. These include using GPS satellites to determine geo-coordinates, i.e., latitude and longitude, of a vehicle 101. The GPS 110 may also receive input, e.g., geo-coordinates, a street address or the like, etc. of a location of a target passenger. Such input may alternatively or additionally be provided to the computer 105 from a user device 145, e.g., via the network 130. Further, the autonomous module 106 could use information from the GPS 110 and/or a user device 145 to generate a route to be followed to an intended destination.

Lidar 115 includes one or more lidar sensors. As is known, lidar 115 can be used to generate three-dimensional data concerning a shape and/or position of an object. As is also known, lidar sensors 115 are also capable of providing surface reflectivity measurements. Such reflectivity information could be used in a model 125, and for comparison to a model 125.

Supplemental sensors 120 include one or more image sensors, e.g. cameras. The supplemental sensors 120 may be used in conjunction with lidar 115 to provide data to be compared to a personal model 125. Supplemental sensors 120 could include other kinds of sensors, e.g., ultrasonic sensors or the like, used to locate an object.

Personal model 125 includes a representation of a person, e.g., a potential vehicle passenger, using various data, such as lidar and/or image data. The model 125 and thus provides a set of data for comparison to data from lidar 115 and possibly also sensors 120 such as image sensors in a vehicle 101. That is, lidar 115 and possibly also image sensor 120 data relating to a person standing at or near a vehicle pickup location could be provided to the computer 105, and compared to a personal model 125 stored in a memory of the computer 105. If the comparison indicates a match within a predetermined degree of confidence, e.g., 90 percent confidence or higher, then, as described further below, the vehicle 101 may navigate to a location very near, e.g., within one meter, three meters, etc., e.g., as close as possible permitted by safety considerations, road and/or sidewalk configurations, etc.

A personal model 125 may be created according to a data gathering process in which a person sits and/or stands at a one or more specified locations with respect to, lidar 115 and possibly also sensors 120, e.g., a specified distance from a vehicle 101, and then is scanned by lidar 115 and possibly also sensors 120. Further, in addition to being scanned at more than one location, e.g., distance, relative to the vehicle 101 and its sensors 115, 120, a person may also be scanned at various orientations, e.g., sitting, standing, in profile, frontally, rearwardly, etc. Thus, a model 125 may include representations of a particular person at one or more distances from a vehicle 101 and in one or more orientations and/or at one or more angles.

Note that a personal model 125 may be stored in a memory of the vehicle computer 105. For example, a scanning process such as described above may be used to generate a personal model 125 in the computer 105, whereupon it is stored in the memory of the computer 105. Alternatively or additionally, a personal model 125 could be created using sensors 115, 120, etc. not located in the vehicle 101, e.g., located in a lab or testing center, etc. The personal model 125 could then be stored in a user device 145 and/or in a data store 140 associated with the remote server 135. Then, when a pickup request, discussed below with respect to the process 200, was made from a user device 145 for a particular passenger, a personal model 125 could be provided to the computer 105 from the user device 145 and/or the data store 140.

The network 130 represents one or more mechanisms by which a vehicle 101 computer 105 may communicate with a remote server 125. Accordingly, the network 130 may be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth, IEEE 802.11, etc.), local area networks (LAN) and/or wide area networks (WAN), including the Internet, providing data communication services.

The server 135 may be one or more computer servers, each generally including at least one processor and at least one memory, the memory storing instructions executable by the processor, including instructions for carrying out various of the steps and processes described herein. The server 135 includes or is communicatively coupled to a data store 140 for storing data including one or more personal models 125.

A user device 145 may be any one of a variety of computing devices including a processor and a memory, as well as communication capabilities. For example, the user device 145 may be a portable computer, tablet computer, a smart phone, etc. that includes capabilities for wireless communications using IEEE 802.11, Bluetooth, and/or cellular communications protocols. Further, the user device 145 may use such communications capabilities to communicate via the network 130 and also directly with a vehicle computer 105, e.g., using an in-vehicle communications mechanism, e.g., Bluetooth.

Process

Figure 2:
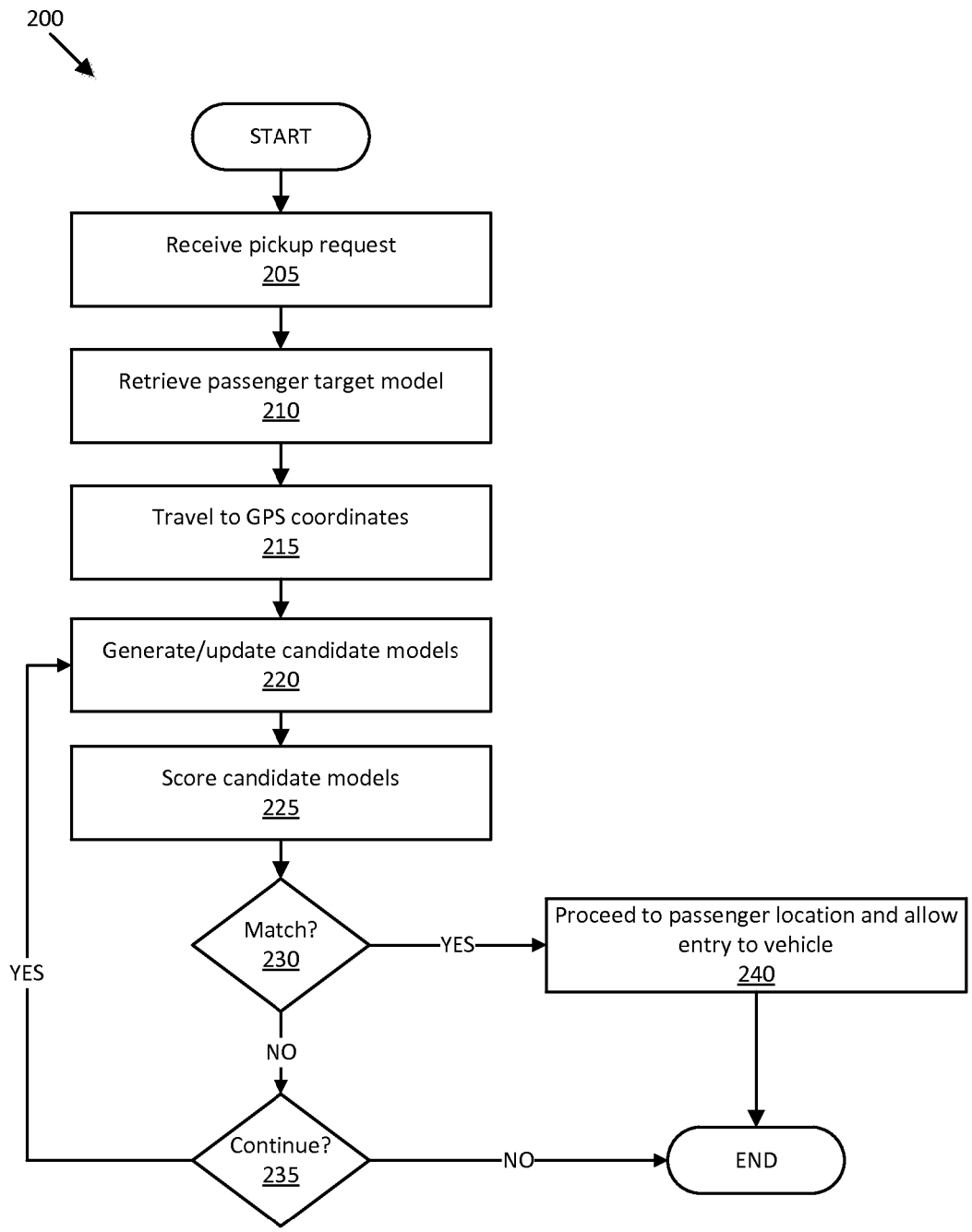
FIG. 2 is a diagram of an example process for identifying and/or locating a vehicle passenger.

FIG. 2 is a diagram of an example process 200 for identifying and/or locating a vehicle passenger. The process 200 begins in a block 205, in which the vehicle computer 105 receives a passenger pickup request. For example, a user device 145 could be used to send a pickup request to the vehicle computer 105 via the network 130. The user device 145, as part of such request, could specify GPS coordinates to the vehicle computer 105. Further, the request generally includes an identifier for a passenger to be picked up, that is, a personal identifier associated with a particular person, and may also include personal model 125 data, e.g., from the memory of a device 145 used to make the request. In any case, the model retrieved and/or stored as described in this block 210 is sometimes referred to as the "target model 125." That is, the target model 125 provides a model of lidar and possibly also other data, e.g., image data, of a passenger to be picked up.

Next, in a block 210, the computer 105 retrieves a personal model 125 associated with the pickup request. That is, the identifier for the passenger to be picked up provided in the pickup request could be used to retrieve a model 125 from the memory of the computer 105 and/or from the server 135 and data store 140. Moreover, as mentioned above, a model 125 may alternatively or additionally be provided from a memory of the device 145.

In the next block, a block 215, the autonomous module 106 navigates the vehicle 101 to the GPS coordinates specified in the request of the block 205. For example, the autonomous module 106 may use a route generation algorithm or the like such as is known to determine a route to the specified GPS coordinates, and may then navigate the vehicle 101 to such coordinates.

Next, in a block 220, having arrived at GPS coordinates specified in a pickup request, the computer 105 obtains data from lidar 115 and possibly also sensors 120 such as cameras or the like. From this data, the computer 105 generates candidate models to be compared to the target model 125. For example, the computer 105 may gather lidar and/or image data of objects surrounding the vehicle 101. From this data, the computer 105 may generate object models. The computer 105 may be programmed to identify objects that could be associated with humans, i.e., potential passengers for pickup.

Next, in a block 225, having identified candidate models as described with respect to the block 220, the computer 105 scores each of the models, i.e., compares each of the candidate models to the target model 125. For example, a score for each of the models could indicate a degree of confidence that the candidate model matches the target model 125.

Next, in a block 230, the computer 105 determines whether any of the candidate models matches the target model 125, e.g., whether a degree of confidence of a match exceeds a predetermined threshold such as 90 percent. If one of the candidate models matches the target model 125, then the computer 105 stores the matching candidate model, and the process 200 proceeds to a block 240. If more than one of the candidate models matches the target model 125, then the computer 105, in some implementations, proceeds to a block 235, but in other implementations may select the highest-matching candidate model, e.g., the candidate model matching with a highest degree of confidence, and proceed to the block 240 having stored the highest-matching candidate model as a matching candidate model.

In the block 235, which may follow the block 230, the computer 105 determines whether the process 200 should continue. For example, the vehicle 101 could be powered off, the pickup request could be canceled, etc. Further, the computer 105 could be programmed to end the process 200 after a predetermined period of time without finding a matching candidate model, e.g., one minute, two minutes, etc. If the process 200 is determined not to continue, then the process 200 ends. Otherwise, the process 200 returns to the block 220.

In the block 240, which may follow the block 230, the vehicle 101 proceeds to a location of the matched candidate model, and allows a passenger entry to the vehicle 101, e.g., unlock stores, etc. The vehicle 101 proceeds to the location of the matched candidate model according to execution of instructions in the autonomous module 106, e.g., data from sensors 115, 120 may indicate a location of an object, i.e., a passenger to be picked up, based on a matched candidate model. The computer 105 may be programmed, e.g., via the autonomous module 106, to navigate the vehicle 101 to within a predetermined distance, e.g., one meter, three meters, etc., or some other distance as dictated by safety considerations and/or road, sidewalk, etc. configuration, of a passenger to be picked up.

Conclusion

Computing devices such as those discussed herein generally each include instructions executable by one or more computing devices such as those identified above, and for carrying out blocks or steps of processes described above. For example, process blocks discussed above may be embodied as computer-executable instructions.

Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A system, comprising a computer for installation in an autonomous vehicle, the computer comprising a processor and a memory, the memory storing instructions executable by the processor to:

store at least one first model that includes lidar data representing a particular human person;

receive a request to pick up a passenger, the request including a first location that is a passenger pickup location;

cause the vehicle to navigate to the first location;

identify the passenger as the particular human person represented in the first data model by comparing a second model that includes lidar data generated from vehicle sensor data with the first model that includes lidar data; and cause the vehicle to navigate from the first location that is the passenger pickup location to a second location that is determined according to the second model to be a more precise location of the passenger than the first location.

2. The system of claim 1, wherein the computer is further programmed to cause the vehicle to provide the passenger with access to the vehicle upon identifying the passenger.

3. The system of claim 1, wherein the first model further data includes image data.

4. The system of claim 3, wherein the vehicle sensor data includes image data.

5. The system of claim 1, wherein the at least one first model is a plurality of first models.

6. The system of claim 5, wherein the computer is further programmed to score each of the first models based on the comparison to the second model, and to identify the passenger according to a highest scoring first model.

7. The system of claim 6, wherein the computer is further programmed to identify the passenger only if the highest scoring first model matches the second model within a predetermined degree of confidence.

8. The system of claim 1, wherein the computer is further programmed to retrieve at least one first model from a remote device.

9. The system of claim 1, wherein at least one first model is provided with the request.

10. A method performed by an autonomous vehicle, comprising:
    storing at least one first model that includes lidar data representing a particular human person;
    receiving a request to pick up a passenger, the request including a first location that is a passenger pickup location;
    causing the vehicle to navigate to the first location;
    identifying the passenger as the particular human person represented in the first data model by comparing a second model that includes lidar data generated from vehicle sensor data with the first model that includes lidar data; and
    navigating from the first location that is the passenger pickup location that to a second location that is determined according to the second model to be a more precise location of the passenger than the first location.

11. The method of claim 10, further comprising providing the passenger with access to the vehicle upon identifying the passenger.

12. The method of claim 10, wherein the first model further data includes image data.

13. The method of claim 12, wherein the vehicle sensor data includes image data.

14. The method of claim 10, wherein the at least one first model is a plurality of first models.

15. The method of claim 14, further comprising scoring each of the first models based on the comparison to the second model, and identifying the passenger according to a highest scoring first model.

16. The method of claim 15, further comprising identifying the passenger only if the highest scoring first model matches the second model within a predetermined degree of confidence.

17. The method of claim 10, further comprising retrieving at least one first model from a remote device.

18. The method of claim 10, wherein at least one first model is provided with the request.

* * * * *

UNITED STATES PATENT AND TRADEMARK OFFICE
CERTIFICATE OF CORRECTION

PATENT NO.         : 9,823,081 B2
APPLICATION NO.    : 14/559136
DATED              : November 21, 2017
INVENTOR(S)        : Mark Crawford et al.

It is certified that error appears in the above-identified patent and that said Letters Patent is hereby corrected as shown below:

In the Claims

Column 8, in Line 7, Claim 10 replace "pickup location that to a second" with -- pickup location to a second --.

Signed and Sealed this
Twenty-second Day of May, 2018

Andrei Iancu
*Director of the United States Patent and Trademark Office*